United States Patent
Moon et al.

(10) Patent No.: US 9,409,157 B2
(45) Date of Patent: Aug. 9, 2016

(54) CATALYST FOR REFORMING HYDROCARBONS

(71) Applicant: KOREA INSTITUTE OF SCIENCE AND TECHNOLOGY, Seoul (KR)

(72) Inventors: Dong Ju Moon, Seoul (KR); Young Chul Kim, Gwangju (KR); Hye Jeong Ok, Gyeongsangnam-do (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 396 days.

(21) Appl. No.: 13/909,359

(22) Filed: Jun. 4, 2013

(65) Prior Publication Data

US 2014/0148332 A1    May 29, 2014

(30) Foreign Application Priority Data

Nov. 23, 2012    (KR) .................... 10-2012-0133955

(51) Int. Cl.
*B01J 23/58* (2006.01)
*B01J 23/888* (2006.01)
*B01J 23/887* (2006.01)

(52) U.S. Cl.
CPC ............ *B01J 23/888* (2013.01); *B01J 23/8872* (2013.01); *B01J 23/8878* (2013.01)

(58) Field of Classification Search
CPC ... B01J 23/888; B01J 23/8872; B01J 23/8878
USPC ........................................................ 502/330
See application file for complete search history.

(56) References Cited

U.S. PATENT DOCUMENTS

2003/0165424 A1*  9/2003  Ramani et al. ............... 423/651

FOREIGN PATENT DOCUMENTS

KR    1020050099407 A    10/2005
KR    1020100011687 A    2/2010

OTHER PUBLICATIONS

Borowiecki et al., Influence of molybdenum and tungsten additives on the properties of nickel steam reforming catalysts, Catalysis Letters 1994, vol. 25, Issue 3-4, pp. 309-313.*
Hyo-Won Kim, et al; "Preparation of supported Ni catalysts on various metal oxides with core/shell structures and their tests for the steam reforming of methane", Chemical Engineering Journal, vol. 168, pp. 775-783, Apr. 2011.
Kee Young Koo, et al; "Coke study on MgO-promoted Ni/Al$_2$O$_3$ catalyst in combined H$_2$O and CO$_2$ reforming of methane for gas to liquid (GTL) process", Applied Catalysis A: General; vol. 340, pp. 183-190; Available online Feb. 17, 2008.

* cited by examiner

*Primary Examiner* — Stanley Silverman
*Assistant Examiner* — Haytham Soliman
(74) *Attorney, Agent, or Firm* — Ladas & Parry LLP

(57) ABSTRACT

Provided is a catalyst for preparing a syngas by reforming methane wherein a nickel-based catalyst is mixed with a metal oxide catalyst. More particularly, alumina is used as a support and a metal oxide catalyst including magnesia, nickel, vanadium, tungsten, iron, molybdenum or chromium is used to inhibit carbon deposition and maintain or improve catalytic activity.

7 Claims, 2 Drawing Sheets

CATALYST FOR REFORMING HYDROCARBONS

CROSS-REFERENCE TO RELATED APPLICATIONS

This application claims priority under 35 U.S.C. §119 to Korean Patent Application No. 10-2012-0133955, filed on Nov. 23, 2012, in the Korean Intellectual Property Office, the disclosure of which is incorporated herein by reference in its entirety.

BACKGROUND (a) Technical Field

The present invention relates to a mixture of a nickel-based catalyst and a metal oxide as a catalyst for preparing a syngas by reforming methane, more particularly to a metal catalyst including magnesia, nickel, vanadium, tungsten, iron, molybdenum and chromium supported on an alumina support, which exhibits inhibited carbon deposition and improved catalytic activity.

(b) Background Art

The technology of liquefying natural gas has been drawing attentions since it can reduce emissions of carbon dioxide, which is the main cause of global warming, produced when natural gas obtained as byproduct in oil fields is burnt. The gas-to-liquids technology is also the key protect of major petroleum companies because of technical and politic advantages such as utilization of medium-to-small-sized gas resources, coping with depletion of petroleum resources, or the like. Reforming, which is an indispensable technique in liquefying natural gas, is preoccupied by foreign conglomerates. Since the natural gas liquefaction requires more than 60% of investment cost initially, studies are intensively under way to reduce the investment cost.

In the natural gas liquefaction technology, production of hydrogen and carbon monoxide through reforming is a very important process and researches are actively under way on catalysts used in this process. The reforming techniques for preparing a syngas from methane include steam reforming, carbon dioxide reforming, partial oxidation reforming reaction, or the like.

Steam reforming of methane follows Reaction Formula 1 and a nickel-based catalyst is used in general.

$$CH_4+H_2O=CO+3H_2 \; H_{A298}=+206 \; kJ/mol \quad \text{[Reaction Formula 1]}$$

During the steam reforming reaction, the catalyst becomes inactivated due to sintering and carbon deposition. In order to prevent this problem, a large amount of steam is supplied. Further, addition of a cocatalyst or modification of a catalyst preparation method is studied to prevent carbon deposition.

The carbon dioxide reforming reaction of methane follows Reaction Formula 2 and a nickel-based catalyst is used in general.

$$CH_4+CO_2=2CO+2H_2 \; H_{A298}=+247.3 \; kJ/mol \quad \text{[Reaction Formula 2]}$$

The carbon dioxide reforming reaction is significant in that it consumes methane and carbon dioxide which are major contributors to global warming. The reaction is strongly endothermic and reaction activity increases with temperature. Further, this reaction is characterized in that carbon formation is thermodynamically favored since the reaction gas has a high carbon-to-hydrogen ratio. In order to prevent catalyst deactivation due to the carbon deposition, a cocatalyst or a noble metal-supported catalyst is used. Although the noble metal-based catalyst exhibits good activity, it is too expensive to be industrially used.

The steam carbon dioxide reforming reaction of methane follows Reaction Formula 3.

$$3CH_4+CO_2+2H_2O=4CO+8H_2 \quad \text{[Reaction Formula 3]}$$

This reforming reaction is advantageous in that the carbon deposition of the steam reforming and carbon dioxide reforming reactions can be solved and an $H_2$/CO ratio adequate for the Fischer-Tropsch (F-T) synthesis can be achieved.

Regarding catalysts for the methane reforming reaction, *Applied Catalysis A: General*, 340 (2008), 183-190 discloses a $Ni/MgO/Al_2O_3$ catalyst prepared by the incipient method on an alumina support for Steam and Carbon dioxide reforming of methane. More specifically, it describes preparation of the $Ni/MgO/Al_2O_3$ catalyst and improvement of resistance to carbon deposition using magnesia as a promoter. In the present invention, a metal oxide is added in addition to the $Ni/MgO/Al_2O_3$ catalyst to maximize resistance to carbon deposition by gasifying carbon.

*Chemical Engineering Journal*, 168 (2011), 775-783 discloses a catalyst having a core/shell structure for steam reforming of methane. In contrast, in the present invention, a catalyst is prepared by an impregnation method and it is used for Steam and Carbon dioxide reforming of methane.

Korean Patent Application No. 10-2005-0099407 (Oct. 20, 2005), which relates to a nickel-based catalyst for producing a syngas by tri-reforming reaction of methane and a tri-reforming reaction of methane using the catalyst, discloses a catalyst wherein a nickel (Ni) metal is supported on a zirconia support doped with a metal selected from an yttrium (Y) metal, a lanthanide element and an alkaline earth metal element. However, the catalyst using the yttrium (Y) metal, the lanthanide element and the alkaline earth metal element as promoter is limited in the life of the catalyst because it lacks resistance to carbon deposition.

Korean Patent Application No. 10-2010-0011687 (Jul. 25, 2008), which relates to a method for preparing a catalyst for carbon dioxide reforming of methane and a reforming method using same, discloses a method of preparing a catalyst by dipping a mesoporous silica molecular sieve carrier in an aqueous solution of nickel nitrate and then drying and sintering and describes that the conversion rate of methane and carbon dioxide and the yield of a mixed gas can be stably maintained since deactivation due to carbon deposition is prevented. However, because it is not easy to achieve resistance to carbon deposition at a relatively high pressure of 20 bar, it is not applicable to a process associated with Fischer-Tropsch (F-T) synthesis. In addition, the catalyst is applicable only to carbon dioxide reforming of methane and does not have resistance to carbon deposition when used for methane reforming combining steam reforming and carbon dioxide reforming as in the present invention.

To conclude, although the steam carbon dioxide reforming (SCR) of methane combining steam reforming and dry reforming is attractive in that it utilizes $CO_2$, a commercial-scale process has not been developed yet because of catalyst deactivation due to carbon deposition.

Throughout the specification, a number of publications and patent documents are referred to and cited. The disclosure of the cited publications and patent documents is incorporated herein by reference in its entirety to more clearly describe the state of the related art and the present invention.

SUMMARY

The present invention provides a catalyst with maximized resistance to carbon deposition in which magnesia is used as a promoter and to which a metal oxide is added. Specifically, while the existing catalyst uses an yttrium (Y) metal, a lanthanide element and an alkaline earth metal element as promoter, the present invention provides a catalyst with maximized resistance to carbon deposition by using magnesia and a metal oxide as promoter and gasifying carbon to carbon dioxide and carbon monoxide.

The present invention also provides a catalyst for Steam and Carbon dioxide reforming of methane. More specifically, the present invention provides a catalyst that exhibits stronger resistance to carbon deposition at high pressure as compared to the existing catalyst and exhibits an adequate $H_2$/CO ratio for application to production of a syngas (Fischer-Tropsch synthesis).

Development of a high-performance catalyst that solves the catalyst deactivation problem caused by carbon deposition is of great importance in a tri-reforming reaction of methane combining steam reforming and dry reforming. To solve the carbon deposition problem, the inventors of the present invention have investigated the effect of a nickel-based catalyst and a metal oxide catalyst on carbon deposition. As a result, it was confirmed that the catalyst of the present invention has improved catalytic activity and strong resistance to carbon deposition. Accordingly, the present invention is directed to providing a catalyst that has improved catalytic activity and strong resistance to carbon deposition and a method for preparing same.

In an aspect, the present invention provides a catalyst for steam carbon dioxide reforming (SCR) of natural gas with inhibited carbon deposition and improved catalytic activity, wherein a Ni/MgO/$Al_2O_3$ catalyst using alumina as a support is mixed with an X/Y-type metal oxide catalyst including magnesia, nickel, vanadium, tungsten, iron, molybdenum or chromium at a specific ratio.

In another aspect, the present invention provides a reforming catalyst having resistance to carbon deposition, wherein catalysts represented by Chemical Formula 1 and Chemical Formula 2 are mixed with a specific molar ratio:

$$Ni/MgO/Al_2O_3 \qquad \text{[Chemical Formula 1]}$$

wherein MgO is included in an amount of 5-30 parts by weight, specifically 20 parts by weight, and Ni is included in an amount of 2-40 parts by weight, specifically 12 parts by weight, based on 100 parts by weight of an alumina support; and $$X/Y \qquad \text{[Chemical Formula 2]}$$

wherein X is selected from the group consisting of molybdenum, chromium and vanadium, Y is selected from the group consisting of iron, molybdenum and tungsten and a molar ratio of X and Y is 0.1-5, specifically 3.

The catalyst of the present invention, wherein the metal oxide catalyst containing vanadium, tungsten, iron or molybdenum and the nickel-based catalyst using magnesia as a promoter are mixed, exhibits better activity than the existing nickel-based catalyst because of superior resistance to carbon deposition and is capable of producing a syngas having an $H_2$/CO molar ratio of 2. Accordingly, it can be used for production of a syngas (Fischer-Tropsch synthesis). Further, it may be used for carbon capture and storage (CCS) since it can be used to prepare a syngas for production of clean fuel using the greenhouse gas carbon dioxide as a reactant.

In an aspect, the present invention provides a catalyst wherein the catalysts of Chemical Formulas 1 and 2 are mixed. The catalyst of Chemical Formula 2 may be used in an amount of 5-30 wt % based on the weight of the catalyst of Chemical Formula 1.

$$Ni/MgO/Al_2O_3 \qquad \text{[Chemical Formula 1]}$$

In Chemical Formula 1, MgO may be included in an amount of 5-30 parts by weight, specifically 20 parts by weight, and Ni may be included in an amount of 2-40 parts by weight, specifically 12 parts by weight, based on 100 parts by weight of the alumina support.

$$X/Y \qquad \text{[Chemical Formula 2]}$$

In Chemical Formula 2, X may be selected from the group consisting of molybdenum, chromium and vanadium, Y may be selected from the group consisting of iron, molybdenum and tungsten and a molar ratio of X and Y may be 0.1-5, specifically 3.

In another aspect, the present invention provides a method for preparing the nickel-based catalyst represented by Chemical Formula 1, including:

preparing a mixture in which magnesia is supported on an alumina support;

stirring the mixture for 1 hour, condensing at 75-85° C. and drying at 95-110° C.; and calcinating the dried product at 750-900° C. for 5-6 hours:

In another aspect, the present invention provides a method for preparing the metal oxide catalyst represented by Chemical Formula 2, including:

preparing a catalyst by dissolving precursors containing the elements X and Y in water, mixing and drying through evaporation; and calcinating the catalyst at 500° C. or above for at least 1 hour.

BRIEF DESCRIPTION OF THE DRAWINGS

The above and other objects, features and advantages of the present invention will now be described in detail with reference to certain exemplary embodiments thereof illustrated in the accompanying drawings which are given hereinbelow by way of illustration only, and thus are not limitative of the invention, and wherein.

DETAILED DESCRIPTION

Figure 1:
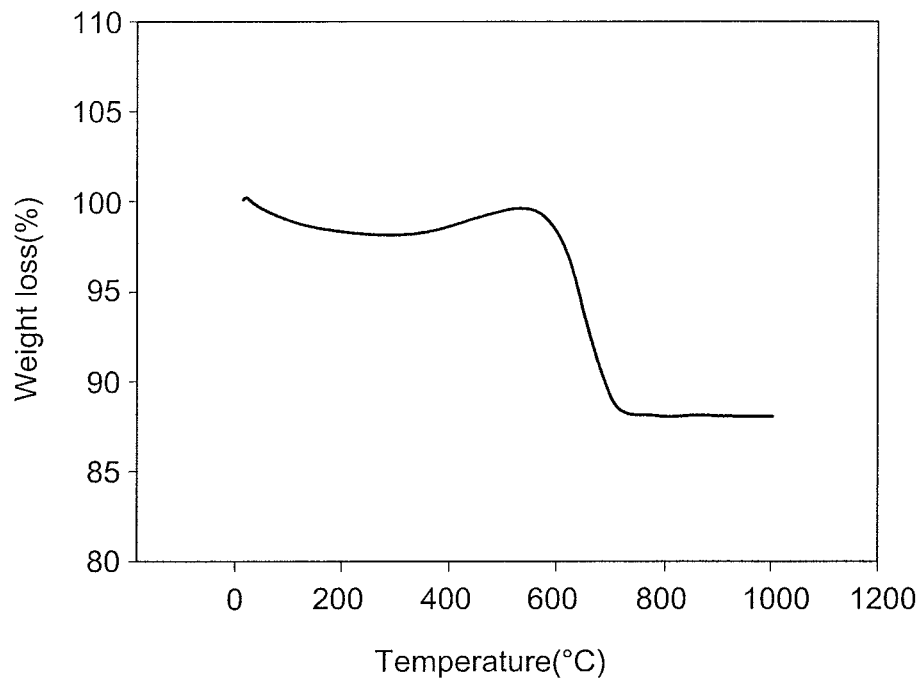
FIG. 1 shows a TGA result of a catalyst prepared in Example 1.

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a catalyst for a tri-reforming reaction of methane wherein a nickel-based catalyst represented by Chemical Formula 1 is mixed with a metal oxide catalyst represented by Chemical Formula 2.

In the catalyst of the present invention, the catalyst of Chemical Formula 2 may be used in an amount of 5-30 wt % based on the weight of the catalyst of Chemical Formula 1.

$Ni/MgO/Al_2O_3$ [Chemical Formula 1]

In Chemical Formula 1, MgO may be included in an amount of 5-30 parts by weight, specifically 20 parts by weight, and Ni may be included in an amount of 2-40 parts by weight, specifically 12 parts by weight, based on 100 parts by weight of the alumina support.

X/Y [Chemical Formula 2]

In Chemical Formula 2, X may be selected from the group consisting of molybdenum, chromium and vanadium, Y may be selected from the group consisting of iron, molybdenum and tungsten and a molar ratio of X and Y may be 0.1-5, specifically 3.

The present invention also provides a method for preparing the nickel-based catalyst represented by Chemical Formula 1, including:

preparing a mixture in which magnesia is supported on an alumina support;

stirring the mixture for 1 hour, condensing at 75-85° C. and drying at 95-110° C.; and calcinating the dried product at 750-900° C. for 5-6 hours:

The present invention also provides a method for preparing the metal oxide catalyst represented by Chemical Formula 2, including:

preparing a catalyst by dissolving precursors containing the elements X and Y in water, mixing and drying through evaporation; and calcinating the catalyst at 500° C. or above for at least 1 hour.

Before performing a reaction, the mixture of the catalysts of Chemical Formulas 1 and 2 may be reduced at about 700° C. for about 1 hour.

A reaction using the catalyst of the present invention is performed at about 700° C. under an atmospheric pressure.

The present invention also provides a method for preparing a syngas including carbon monoxide and hydrogen by reacting a mixed gas of methane, carbon dioxide and steam with a volume ratio of about 1:0.8:1 in the presence of the catalyst.

Preparation of the Catalyst of Chemical Formula 1

An adequate amount of a magnesium precursor $Mg(NO_3)_2 \cdot 9H_2O$ is dissolved in water considering the composition of Chemical Formula 1. After mixing with an alumina support, the mixture is distilled at 80° C. under reduced pressure to evaporate water. After drying at 100° C. for a day, the resultant is calcined at 800° C. for 6 hours. Next, the same procedure is repeated using a nickel precursor $Ni(NO_3)_2 \cdot 6H_2O$.

Preparation of the Catalyst of Chemical Formula 2

Adequate amounts of precursors including elements X and Y are dissolved in water and, after mixing, a catalyst is prepared through evaporation drying. The catalyst is then calcined at 800° C. above at least 6 hours.

Evaluation of Catalytic Activity

A result of performing catalytic reactions using catalysts of Examples 1-5 with different compositions is summarized in Table 1.

First, a catalyst in which the catalyst of Chemical Formula 2 is mixed in an amount of 0 wt % or 5-30 wt % based on the weight of the catalyst of Chemical Formula 1 was packed in a reactor. The reactor was 300 mm in length and ½ inch in inner diameter and was made of Inconel. A mixed gas of methane, carbon dioxide and steam at a molar ratio of 1:0.8:1 was supplied into the reactor at a flow rate of 13,680 mL/g cat·hr while flowing argon at 30 mL/min. After performing reaction at 700° C. under an atmospheric pressure, the produced gas was analyzed by gas chromatography.

TABLE 1

| | Chemical Formula 1 Parts by weight of MgO and Ni of $Ni/MgO/Al_2O_3$ | Chemical Formula 2 | | Chemical Formula 2/ Chemical Formula 1 | $CH_4$ conversion rate (%) | $CO_2$ conversion rate (%) | $H_2/CO$ | Carbon deposition (%) |
|---|---|---|---|---|---|---|---|---|
| | | Composition | Molar ratio | | | | | |
| Example 1 | 20/12 | — | | 0 | 77.9 | 65.9 | 1.65 | 12.06 |
| Example 2 | 15/22 | Mo/Fe | 1 | 5-30 wt % | 80.0 | 59.2 | 1.79 | 4.6 |
| Example 3 | 20/12 | Mo/Fe | 3 | 5-30 wt % | 80.1 | 61.9 | 2.12 | 0.5 |
| Example 4 | 20/12 | Cr/Mo | 1 | 5-30 wt % | 79.8 | 57.4 | 2.00 | 2.1 |
| Example 5 | 25/8 | V/W | 1 | 5-30 wt % | 81.2 | 61.4 | 1.74 | 1.5 |

As seen from Table 1, when the catalysts according to the present invention (Examples 2-5) were used, $CH_4$ and $CO_2$ conversion rates were 79.8-81.2% and 59.2-61.9%, respectively. The methane conversion rate was comparable or better than Example 1. The produced mixed gas was adequate for production of a (Fischer-Tropsch synthesis) with a molar ratio of hydrogen and carbon monoxide between 1.5 and 2.5.

Figure 2:
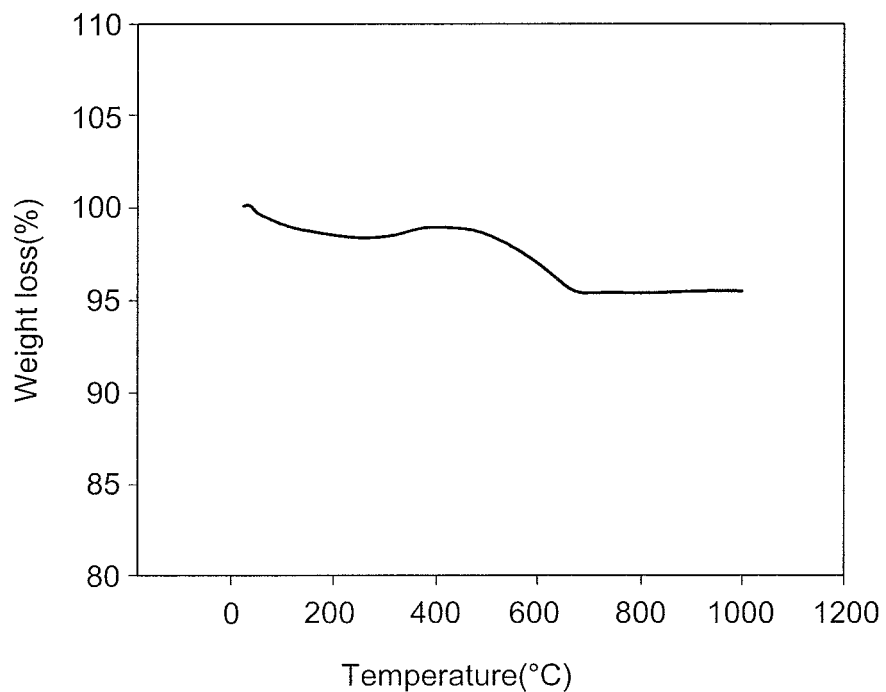
FIG. 2 shows a TGA result of a catalyst prepared in Example 2.
Figure 3:
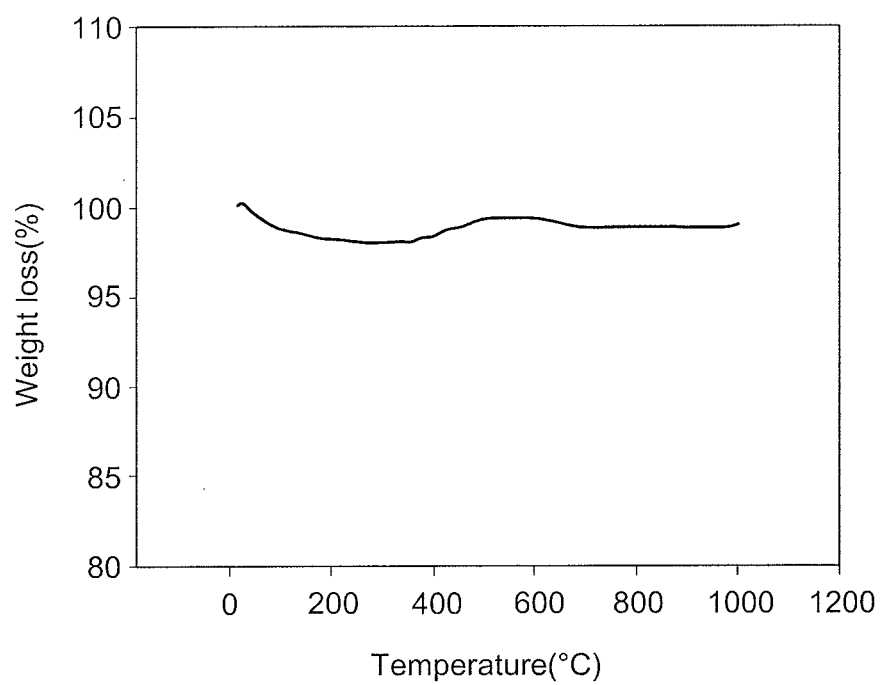
FIG. 3 shows a TGA result of a catalyst prepared in Example 3.

In FIG. 1, a weight loss peak is observed due to deposition of graphite at 500° C. or above. The peak is significantly reduced in FIG. 2 and. This is because carbon deposition decreases since carbon monoxide or carbon dioxide is produced as a result of reaction of deposited carbon with oxygen included in the added metal oxide catalyst. Although carbon dioxide conversion rate in Examples 2-5 is decreased as compared to Example 1, it results in decreased carbon deposition.

Although a reforming catalyst can control the negative effect due to deposition of carbon particles since the catalytically active component is highly dispersed, the catalytic performance decreases after long-term use as the catalytically active component is oxidized by excess steam, carbon dioxide, etc. The carbon particles deposited on the catalyst surface are accumulated on the catalytically active component and the catalyst support, thereby reducing catalytic activity or increasing the amount of catalyst not participating in the reforming reaction by forming drift of the gas flowing in the reactor.

The tri-reforming catalyst according to the present invention wherein a metal oxide catalyst including vanadium, tungsten, iron or molybdenum is mixed with a nickel-based catalyst using magnesia as a promoter exhibits better activity than the existing nickel-based catalyst due to superior resistance to carbon deposition and provides an $H_2/CO$ ratio adequate for production of a syngas (Fischer-Tropsch synthesis). In addition, it is also environmentally meaningful in that is uses the greenhouse gas carbon dioxide as a reactant.

Methods for producing a syngas from natural gas include steam reforming of methane (SRM), partial oxidation of methane (POM) using oxygen and carbon dioxide reforming of methane (CDR). The mixed gases produced from the respective reforming reactions have different ratios of carbon monoxide and hydrogen ($H_2/CO$).

The SRM reaction, which is a strongly endothermic reaction, results in a mixed gas with an $H_2/CO$ ratio of 3 or greater, which is adequate for hydrogen production and ammonia synthesis. The POM reaction results in a mixed gas with an $H_2/CO$ ratio of about 2, which is useful for synthesis of methanol and production of high-boiling-point hydrocarbons by Fischer-Tropsch synthesis.

As the Kyoto Protocol entered into force in 2005 to cope with global warming by reducing carbon dioxide emission, Korea has to prepare policies and measures to reduce carbon dioxide emission from 2013. In this regard, it is urgent to find an effective way to utilize carbon dioxide.

Successful development of a technology for effectively utilizing carbon dioxide, including the Clean Development Mechanism (CDM), will provide economic advantages through $CO_2$ emissions trading.

According to the IEA Outlook of the US DOE in 2010, it is expected the supply of GTL fuel will grow to 400,000 BPD in 2020 and to 800,000 BPD in 2035. Based on this estimation, it is expected that the demand for GTL fuel worldwide will be 1.15 million BPD in 2040. Assuming that 26 Korean GTL-FPSOs produce GTL fuel in 2040 and 50% of their production is supplied to Korea, the Korean market scale is expected to be 38.1 billion $/year and 101.8 billion $/year including overseas market. An effective measure to dispose of $CO_2$ will be to prepare a syngas through the SCR reaction and convert it to useful chemical raw materials or clean fuels, particularly to prepare methanol, DME or synthetic oil through FT synthesis.

A SCR catalyst using $CO_2$ as a reactant can be advantageously applied for offshore gas fields wherein carbon dioxide is included. In particular, since the processes of air separation, $CO_2$ removal, syngas proportion control, etc. are unnecessary, more than 30% of the plant construction cost will be able to be saved.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. A catalyst for a tri-reforming reaction of methane, wherein a nickel-based catalyst represented by Chemical Formula 1 is mixed with a metal oxide catalyst represented by Chemical Formula 2:

$Ni/MgO/Al_2O_3$  [Chemical Formula 1]

wherein MgO is included in an amount of 5-30 parts by weight and Ni is included in an amount of 2-40 parts by weight based on 100 parts by weight of an alumina support; and X/Y  [Chemical Formula 2]

wherein X is selected from the group consisting of molybdenum, chromium and vanadium, and Y comprises iron in which a molar ratio of X and Y is 0.1-5.

2. The catalyst for a tri-reforming reaction of methane according to claim 1, wherein the catalyst of Chemical Formula 2 is used in an amount of 5-30 wt % based on the weight of the catalyst of Chemical Formula 1.

3. The catalyst for a tri-reforming reaction of methane according to claim 1, wherein MgO is included in an amount of 20 parts by weight and Ni is included in an amount of 12 parts by weight.

4. The catalyst for a tri-reforming reaction of methane according to claim 1, wherein a molar ratio of X and Y is 3.

5. The catalyst for a tri-reforming reaction of methane according to claim 1, wherein X comprises molybdenum.

6. The catalyst for a tri-reforming reaction of methane according to claim 1, wherein X comprises chromium.

7. The catalyst for a tri-reforming reaction of methane according to claim 1, wherein Y comprises tungsten.

* * * * *